(12) United States Patent
Swanson et al.

(10) Patent No.: US 12,667,083 B2
(45) Date of Patent: Jun. 30, 2026

(54) MULTI-COMPARTMENT BAG USEFUL FOR WALKING A DOG

(71) Applicants: Kim Marie Swanson, Burbank, CA (US); Johna Sue Beckham, Knoxville, TN (US)

(72) Inventors: Kim Marie Swanson, Burbank, CA (US); Johna Sue Beckham, Knoxville, TN (US)

( * ) Notice: Subject to any disclaimer, the term of this patent is extended or adjusted under 35 U.S.C. 154(b) by 0 days.

(21) Appl. No.: 17/691,252

(22) Filed: Mar. 10, 2022

(65) Prior Publication Data

US 2022/0287275 A1     Sep. 15, 2022

Related U.S. Application Data

(60) Provisional application No. 63/159,243, filed on Mar. 10, 2021.

(51) Int. Cl.
*A01K 23/00*        (2006.01)
*A01K 1/02*         (2006.01)

(52) U.S. Cl.
CPC ............ *A01K 23/00* (2013.01); *A01K 1/0254* (2013.01)

(58) Field of Classification Search
CPC ............. A45F 3/04; A45F 3/042; A45F 3/047
See application file for complete search history.

(56) References Cited

U.S. PATENT DOCUMENTS

| | | | |
|---|---|---|---|
| 2004/0149600 A1* | 8/2004 | Wolter | B65D 69/00 206/223 |
| 2017/0055665 A1* | 3/2017 | Lanzisera | A45C 15/00 |
| 2019/0191669 A1* | 6/2019 | Heatley | A01K 23/00 |
| 2019/0261765 A1* | 8/2019 | Alonzo | A45F 3/02 |
| 2020/0178497 A1* | 6/2020 | Friedgood | A01K 5/01 |

* cited by examiner

*Primary Examiner* — Joshua J Michener
*Assistant Examiner* — Henry Hooper Mudd

(57) ABSTRACT

A dog walking bag includes a central waste-holding compartment that is accessible from openings at the top end and bottom end of the compartment. The dog walking bag further includes a top flap, removably covering the top opening, and a bottom flap, removably covering the bottom opening. When using dog walking bag, a user deposits plastic waste bags containing animal waste (hereinafter "full waste bags") into the central waste-holding compartment through the top opening. When a time arrives to empty the central waste-holding compartment of full waste bags, the bottom flap is manipulated to uncover the bottom opening, allowing the full waste bags to fall out of the central waste-holding compartment by force of gravity. In this way, a user is able to empty the central waste-holding compartment of full waste bags without having to touch or manually handle the full waste bags during the emptying process.

14 Claims, 5 Drawing Sheets

MULTI-COMPARTMENT BAG USEFUL FOR WALKING A DOG

CROSS-REFERENCE TO RELATED APPLICATIONS

This Application claims the benefit under 35 U.S.C. § 119(e) of U.S. Provisional Patent Application Ser. No. 63/159,243, filed Mar. 10, 2021 and entitled "A Multi-Compartment Bag Useful for Walking a Dog," the entire content of which is incorporated herein by reference.

STATEMENT REGARDING FEDERALLY SPONSORED RESEARCH OR DEVELOPMENT

Not Applicable

BACKGROUND OF THE INVENTION

1. Field of Invention

The present invention pertains generally to accessories useful for dog owners while walking their dogs and, more particularly, to a bag with multiple compartments adapted to hold items, including animal waste.

2. Description of the Related Art

Bags for carrying animal waste, and as well for carrying other items that are useful when walking a dog on a leash, are known in the art. A need is still felt for device that allows for the collection and carrying of plastic waste bags holding animal waste and also facilitates emptying the device of plastic waste bags holding animal waste without requiring a user to manually handle the plastic waste bags holding animal waste.

SUMMARY OF THE INVENTION

Disclosed herein are various example embodiments of the present general inventive concept. In some embodiments, a dog walking bag includes a central waste-holding compartment that is accessible from openings at the top end and bottom end of the compartment. The dog walking bag further includes a top flap, removably covering the top opening, and a bottom flap, removably covering the bottom opening. When using dog walking bag, a user deposits plastic waste bags containing animal waste (hereinafter "full waste bags") into the central waste-holding compartment through the top opening. When a time arrives to empty the central waste-holding compartment of full waste bags, the bottom flap is manipulated to uncover the bottom opening, allowing the full waste bags to fall out of the central waste-holding compartment by force of gravity. In this way, a user is able to empty the central waste-holding compartment of full waste bags without having to touch or manually handle the full waste bags during the emptying process.

Thus, in some example embodiments of the present general inventive concept, a dog walking bag includes a bag with an interior volume adapted to serve as a waste-holding compartment, said waste-holding compartment having a top end and a bottom end, said waste-holding compartment having a top end opening proximate said top end and a bottom end opening proximate said bottom end; a top flap to removably cover said top end opening; and a bottom flap to removably cover said bottom end opening; whereby plastic waste bags holding animal waste are deposited in said waste-holding compartment through said top end opening and are extracted from said waste-holding compartment through said bottom end opening.

In some example embodiments of the present general inventive concept, a dog walking bag includes a front piece, back piece, first side piece, and second side piece, said front piece being joined to said first side piece along a first common edge, said back piece being joined to said first side piece along a second common edge, said back piece being joined to said second side piece along a third common edge, and said front piece being joined to said second side piece along a fourth common edge, said front piece, back piece, first side piece, and second side piece cooperatively defining an interior volume adapted to serve as a central waste-holding compartment, said central waste-holding compartment having a top end and a bottom end, said central waste-holding compartment having a top end opening proximate said top end and a bottom end opening proximate said bottom end; a top flap to removably cover said top end opening; and a bottom flap to removably cover said bottom end opening; whereby plastic waste bags holding animal waste are deposited in said central waste-holding compartment through said top end opening and are extracted from said central waste-holding compartment through said bottom end opening.

Some embodiments further include a bottom piece covering said bottom end opening, said bottom piece including a slit adapted to be widened upon need to produce an aperture adapted to permit extraction of the plastic waste bags holding animal waste from said central waste-holding compartment.

Some embodiments further include magnetic closures for securing said top flap and said bottom flap.

Some embodiments further include a side pocket adapted to hold empty plastic waste bags. In some embodiments, said side pocket includes at least one aperture adapted to dispensing empty plastic waste bags.

Some embodiments further include D-rings adapted to connecting a shoulder strap to the dog walking bag. Some embodiments further include elastic strips adapted to hold a flashlight.

Some embodiments further include a pocket to hold dog treats. Some embodiments further include a pocket to hold a cell phone. Some embodiments further include a clear pocket to hold dog identification information.

In various example embodiments, the dog walking bag is fabricated from washable materials. In some embodiments, certain components of the dog walking bag, such as one or more of the pieces, are fabricated from a nylon cloth or similar material. In some embodiments, various components of the dog walking bag are fabricated from recycled materials.

In some embodiments of the present general inventive concept, the dog walking bag further includes a side pocket positioned on the exterior or outboard surface of one of the side pieces. Generally, this side pocket this is sized and configured to hold at least one roll of empty, unused plastic waste bags, ready for use in picking up and holding animal waste. Generally, this side pocket includes at least one aperture adapted to facilitate extraction of an empty, unused plastic waste bag from the side pocket when needed. In the illustrated example embodiment, the side pocket includes two apertures, and the side pocket is sized and configured to hold two rolls of empty, unused plastic waste bags. The apertures are spaced apart in such a way and to a sufficient distance to permit two full rolls of empty, unused plastic waste bags to rest within the side pocket. In some embodiments, the apertures are fitted with dispensers adapted to assist in dispensing one plastic waste bag at a time.

In some embodiments, the dog walking bag includes at least one set of elastic straps on at least one of the outboard surfaces of the bag; these elastic straps are adapted to hold a flashlight or similar device.

In some embodiments, the dog walking bag includes a clip for holding keys.

In some embodiments, the dog walking bag includes a pocket adapted to hold dog treats.

In some embodiments, the dog walking bag includes a pocket adapted to hold a cell phone.

In various example embodiments, one or more of the pockets discussed herein are sealed with magnetic closures.

In various example embodiments, portions of the outboard surfaces of one or more of the pieces are equipped with reflective material adapted to make the dog walking bag more visible at night or in low-light conditions.

In various example embodiments, the dog walking bag is fabricated from washable materials. In some embodiments, certain components of the dog walking bag, such as one or more of the pieces, are fabricated from a nylon cloth or similar material. In some embodiments, various components of the dog walking bag are fabricated from recycled materials.

As described herein, several various example embodiments of the present general inventive concept provide for a dog walking bag that is adapted to hold a number of items useful when walking a dog. Example embodiments according to the present general inventive concept provide a device that allows for the collection and carrying of plastic waste bags holding animal waste and also facilitates emptying the device of full waste bags without requiring a user to manually handle the full waste bags. A dog walking bag according to the present general inventive concept may be attached to a dog leash so that, when a user picks up the leash to begin a walk, the dog walking bag is immediately at hand with a number of items useful when walking a dog.

FIGURES

The above-mentioned and additional features of the invention will become more clearly understood from the following detailed description of the invention read together with the drawings in which.

DETAILED DESCRIPTION

Figures 1A, 1B:
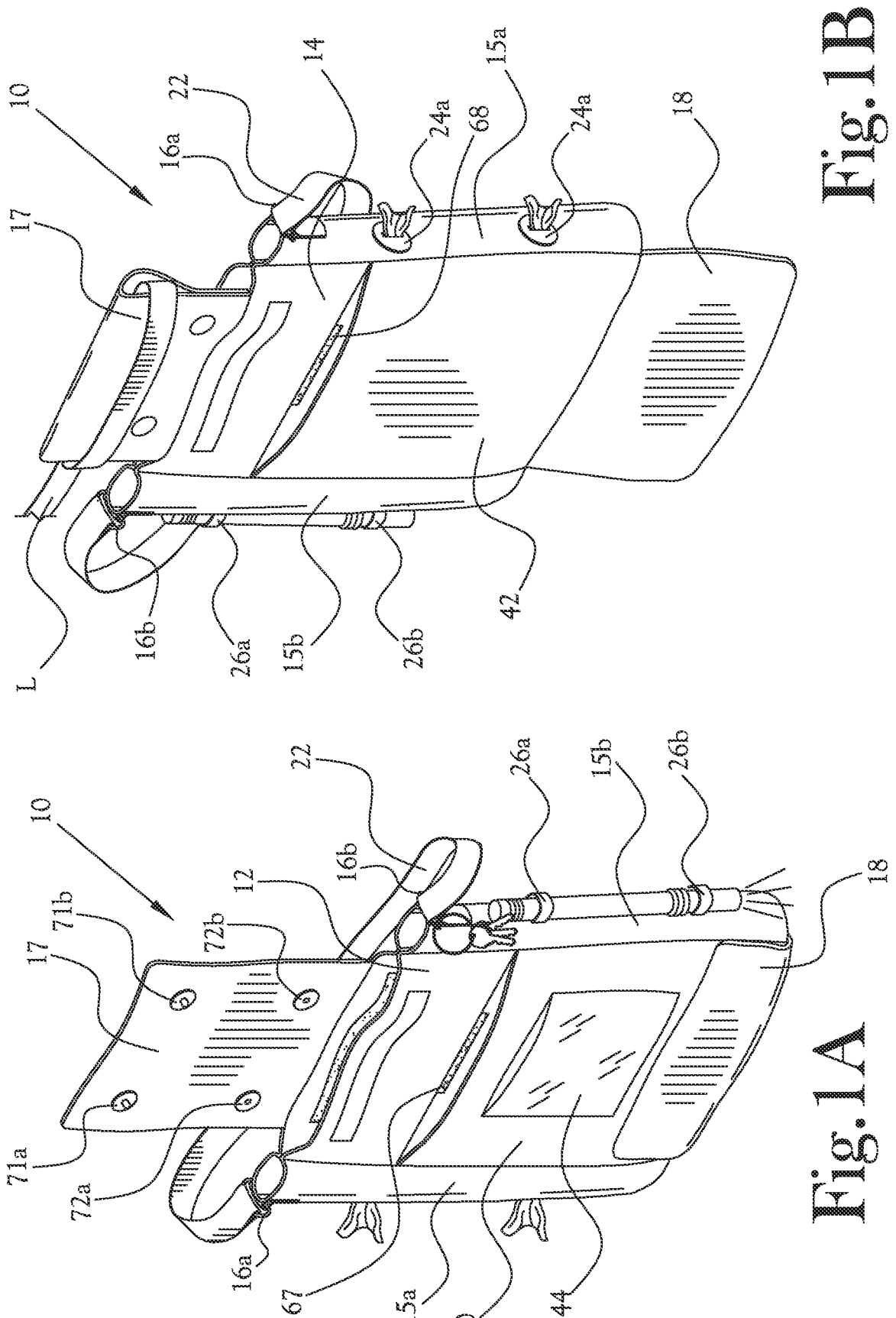
FIG. 1A is a perspective view of a dog walking bag according to one example embodiment of the present general inventive concept.
FIG. 1B is a second perspective view of the example embodiment dog walking bag shown in FIG. 1A, viewing the example embodiment dog walking bag from a different angle.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness In some of its various example embodiments, the present general inventive concept provides a dog walking bag with multiple compartments and components to assist a user when walking a dog on a leash. Turning to FIG. 1A and FIG. 1B and the example embodiment illustrated therein, the illustrated example embodiment dog walking bag 10 includes a front piece 12, a back piece 14, a first side piece 15a, and a second side piece 15b; cooperatively, these pieces—the front piece, back piece, first side piece, and second side piece—define an interior volume. Each piece is joined to each of its two neighbor pieces along a side edge; in some embodiments, the pieces are sewn together, although other methods or means of joining the pieces to each other are known in the art and are contemplated by the present general inventive concept. A top flap 17 and a bottom flap 18 also cooperate in defining the interior volume of the bag 10. With the top flap 17 and the bottom flap 18, the interior volume is accessible from two opposing ends. In the illustrated example embodiment, the top flap 17 is attached (by sewing or other means) to the back piece 14, and rotates around the edge where it is attached to the back piece 14, providing access to the interior of the bag 10 by being movable between a closed setting (shown in FIG. 4) and at least one open setting (FIG. 1A). In the closed setting, the top flap 17 is folded over the top opening of the interior volume, and an edge of the top flap 17 is brought into contact with the front piece 12 so as to cover the top opening of the interior volume. In some embodiments, the top flap 17 is also configured to enable a setting in which the top flap 17 folds around a portion of a leash L, as shown in FIG. 1B. In some embodiments, the top flap 17 is equipped with snaps 71a, 71b, 72a, and 72b configured to fit together with one another to hold the top flap 17 in a folded setting when the top flap 17 is folded around a portion of a leash L. In some embodiments, hook-and-loop fasteners such as VELCRO® are used to hold the top flap 17 in a folded setting when top flap 17 is folded the around a portion of a leash L. Other configurations and other means of securing the top flap 17 in different settings as described herein will be apparent to those of skill in the art and are also contemplated by the present general inventive concept.

Figure 1C:
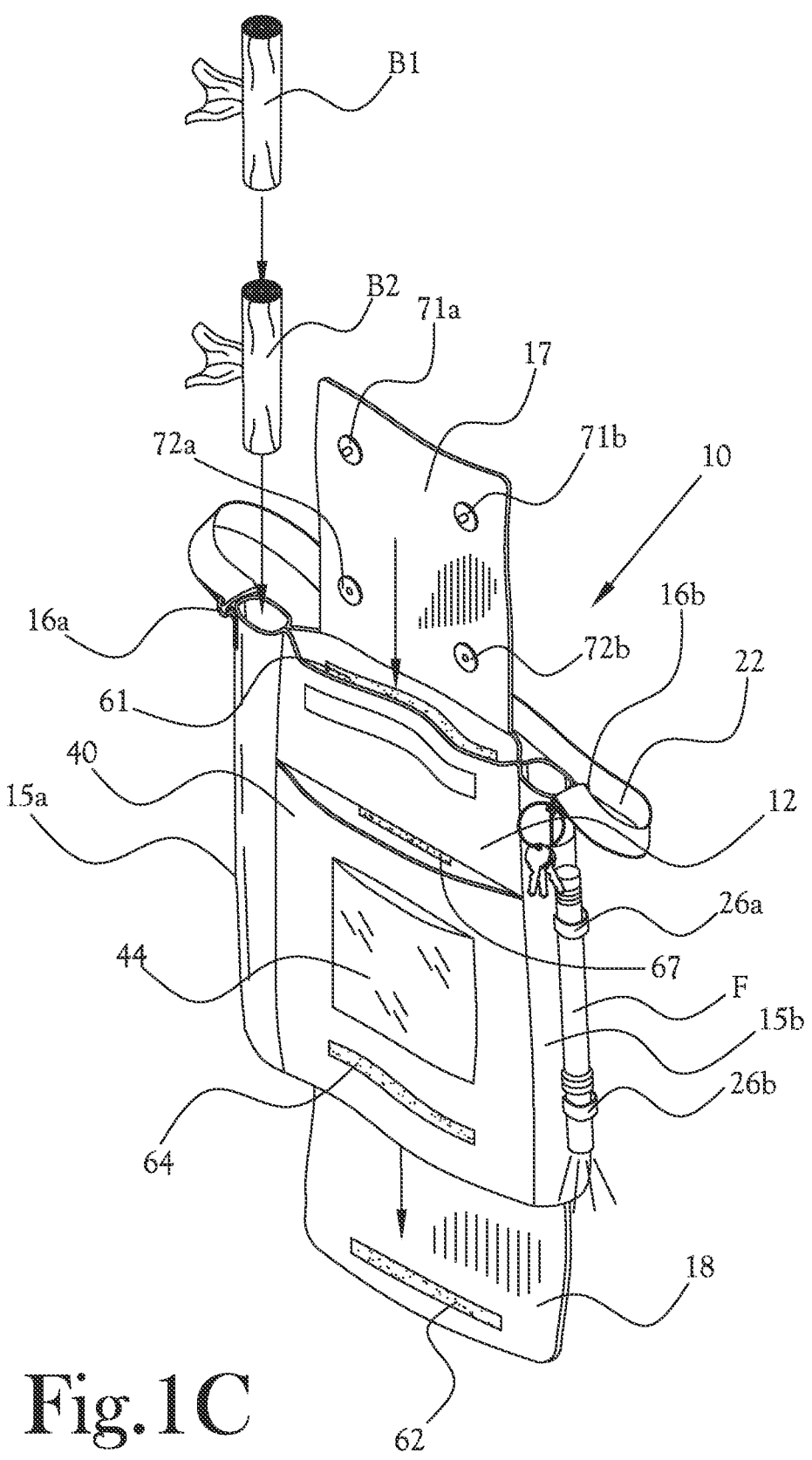
FIG. 1C is a third perspective view of the example embodiment dog walking bag shown in FIGS. 1A and 1B.

In some embodiments, including the illustrated example embodiment, the front piece 12 and the back piece 14 are equipped with paired magnetic closure strips (the magnetic closure strip 61 on the back piece 14 is shown in FIG. 1C), so that when the magnetic closure strips come into contact with each other and form a magnetic closure, they cover the top opening of the interior volume.

Similarly, the bottom flap 18 is attached (by sewing or other means) to the back piece 14, and rotates around the edge where it is attached to the back piece 14, providing access to the interior volume by being movable between a closed setting and at least one open setting. In the closed setting, the bottom flap 18 is folded over the bottom opening of the central waste-holding compartment, and an edge of the bottom flap 18 is brought into contact with the front piece 12 so as to cover the bottom opening of the interior volume. In the illustrated example embodiment, as shown in FIG. 1C, the bottom flap 18 and the front piece 12 are equipped with paired magnetic closure strips 62 and 64, so that when the bottom flap 18 is folded over the bottom opening and brought into contact with the front piece 12, the magnetic closure strips 62 and 64 come into contact with each other and form a magnetic closure, thereby helping to secure the bottom flap 18 to the front piece 12 and to cover the bottom opening.

Figure 2A:
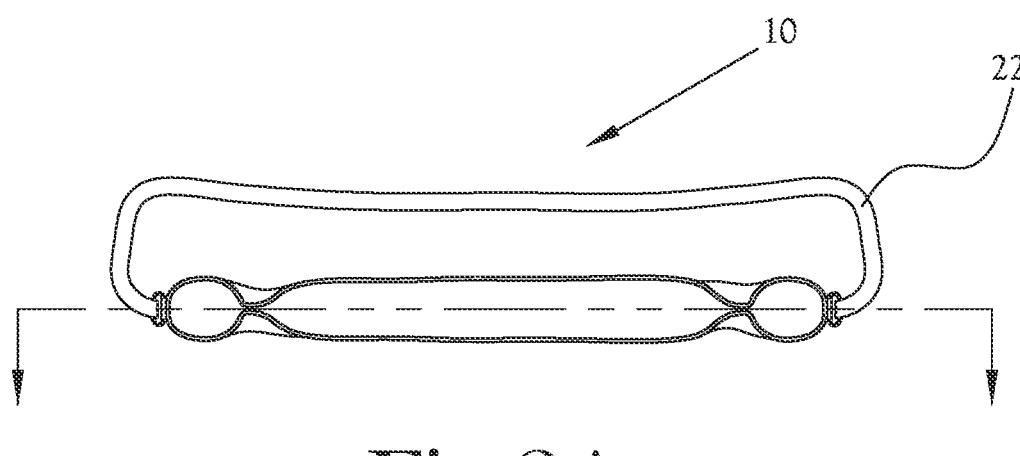
FIG. 2A is a top-down view of the example embodiment dog walking bag shown in the previous Figures, showing the section line along which a sectional view is taken in the next Figure.
Figure 2B:
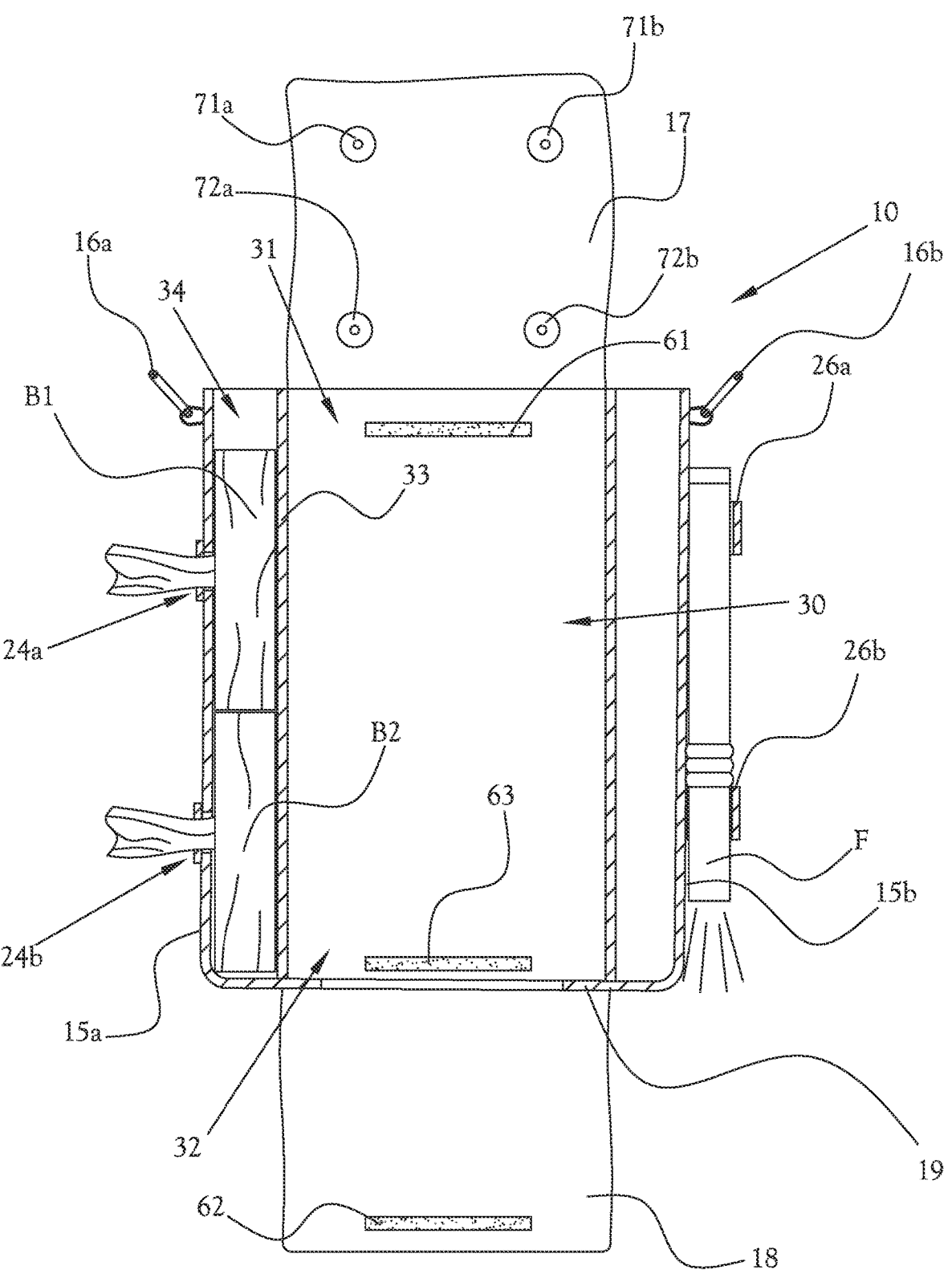
FIG. 2B is a sectional view of the example embodiment dog walking bag shown in the previous Figures.

FIG. 2A is a top-down view of the example embodiment dog walking bag shown in the preceding Figures, showing the section line along which a sectional view is taken in the next Figure. FIG. 2B is a sectional view of the example embodiment dog walking bag shown in the previous Figures. As shown in FIG. 2B, the interior volume of the bag 10 includes a central waste-holding compartment 30. When the dog walking bag 10 is in use, generally used plastic waste bags containing animal waste (hereinafter "full waste bags") are deposited in the central waste-holding compartment 30 through an open top end 31 of the central waste-holding compartment 30, with the top flap 17 in an open setting (and the bottom flap 18 in the closed setting, to prevent full waste bags from falling though the bottom end 32 of the central waste-holding compartment 30). Once the full waste bags have been deposited in the central waste-holding compartment 30, the top flap 17 is folded over the top end 31 of the central waste-holding compartment 30 and placed in the closed setting. When it is time to remove the full waste bags from the central waste-holding compartment 30 (e.g., at the end of a walk), the bottom flap 18 is opened by breaking the magnetic closure (one such magnetic closure strip 74, situated on the front piece 12, is illustrated in FIG. 1A and FIG. 1B); with the bottom flap 18 moved into an open setting, and with the dog walking bag 10 oriented so that the bottom end 32 of the central waste-holding compartment 30 is generally located closer to the ground or walking surface than the top end 31 of the central waste-holding compartment 30, gravity extracts the full waste bags from the central waste-holding compartment 30. In this way, the dog walking bag 10 is configured so that a user is able to empty the full waste bags from the central waste-holding compartment 30 without the user having to manually handle the full waste bags during the emptying process. That is, a user need not manually handle the full waste bags after depositing them in the central waste-holding compartment 30; the dog walking bag according to several example embodiments of the present general inventive concept allows for emptying the central waste-holding compartment of full waste bags without the user needing to manually touch the full waste bags a second time.

Figure 3:
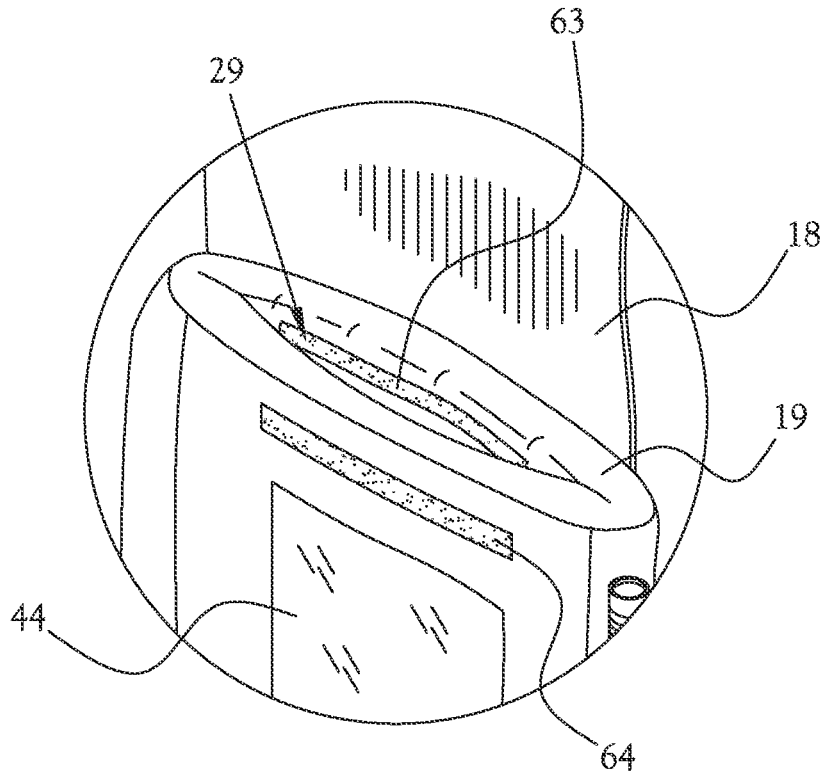
FIG. 3 is a close-up view of a portion of the bottom end of the example embodiment dog walking bag shown in the previous Figures.

Turning to FIG. 3, in some embodiments, the dog walking bag 10 includes a bottom piece 19, which covers the bottom end 32 of the central waste-holding compartment 30, generally positioned between the interior volume of the central waste-holding compartment 30 and the bottom flap 18; that is, from the perspective of an observer looking at the dog walking bag 10 from outside the dog walking bag, the bottom piece 19 is covered by the bottom flap 18. The bottom piece includes a slit 29, which is switchable between a closed setting and an open setting. The slit 29 includes two edges and further includes two paired magnetic strips (one of which, 63, is visible in FIG. 3), with one magnetic strip positioned proximate each edge. When the slit 29 is in the closed setting, the paired magnetic strips meet and magnetically adhere to one another to form a magnetic closure. When the magnetic strips are pulled apart and the slit 29 is switched from the closed setting to the open setting, the now open slit 29 provides access to the interior volume of the central waste-holding compartment. In this embodiment, when it is time to remove the full waste bags from the central waste-holding compartment 30 (e.g., at the end of a walk), the bottom flap 18 is opened by breaking the magnetic closure holding the bottom flap 18 to the front piece 12, and the slit 29 in the bottom piece 19 is switched from the from the closed setting to the open setting by breaking the magnetic closure of the bottom piece 19. With the bottom flap 18 and the slit 29 in the bottom piece 19 both in an open setting, and with the dog walking bag oriented so that the bottom end of the central waste-holding compartment is generally located closer to the ground or walking surface than the top end of the central waste-holding compartment, gravity extracts the full waste bags from the central waste-holding compartment. Again, in this way, the dog walking bag is configured so that a user is able to empty the full waste bags from the central waste-holding compartment without the user having to manually handle the full waste bags during the emptying process. A user need not manually handle the full waste bags after depositing them in the central waste-holding compartment; the dog walking bag according to several example embodiments of the present general inventive concept allows for emptying the central waste-holding compartment of full waste bags without the user needing to manually touch the full waste bags a second time.

In some embodiments, including the illustrated example embodiment, the dog walking bag 10 includes at least two D-rings on opposing outboard surfaces of the bag 10. In the illustrated example embodiment shown in FIGS. 1A and 1B, the D-rings 16a and 16b are located respectively on each of the two side pieces 15a and 15b. These D-rings 16a, 16b allow a user to attach a strap 22 (such as a shoulder strap) or similar carrying means to the dog walking bag 10. The D-rings generally are fabricated from metal, plastic, or similar durable material.

Turning again to FIG. 2B, in some embodiments of the present general inventive concept, the dog walking bag 10 includes a divider piece 33 that interposes between the central waste-holding compartment 30 and a second portion of the interior volume, namely, the ready-bag-holding compartment 34. That is, in the illustrated example embodiment, the dog walking bag 10 includes a side compartment (hereinafter "the ready-bag-holding compartment" 34), generally accessible from an aperture proximate the top end 31 of the central waste-holding compartment 30 and configured to hold one or more sets of empty or unused plastic waste bags (i.e., plastic waste bags that have not yet been used to contain animal waste). As shown in FIG. 2B, the ready-bag-holding compartment 34 is defined and formed by the divider piece 33 and the first side piece 15a. In the illustrated example embodiment, two rolls of unused plastic waste bags B1 and B2 are stored in the ready-bag-holding compartment 34; both rolls B1 and B2 are situated such that the next-to-be-used bag in each roll is positioned partially exposed through one of two dispensing apertures 24a and 24b positioned in the first side piece 15a (as shown also in FIG. 1A). The dispensing apertures 24a and 24b are spaced apart in such a way and to a sufficient distance to permit two full rolls of empty, unused plastic waste bags B1 and B2 to rest within the ready-bag-holding compartment 34. Generally, the dispensing apertures are adapted to assist in dispensing one empty plastic waste bag at a time.

In some embodiments, the dog walking bag includes at least one additional pocket; in the illustrated example embodiment, as shown in FIG. 1A and FIG. 1C, a pocket piece 40 is sewn or otherwise attached to the front piece 12 to form a front pocket, generally adapted to hold additional items, such as dog treats or a cell phone. Additionally, in the illustrated example embodiment, as shown in FIG. 1B, a second pocket piece 42 is sewn or otherwise attached to the back piece 14 to form a back pocket In various example embodiments, one or more of the pockets discussed herein are sealed with magnetic closures. (One such magnetic closure strip 67, situated on the front piece 12, is illustrated in FIG. 1A; another such magnetic closure strip 68, situated on the back piece 14, is illustrated in FIG. 1B.)

In some embodiments, a clear pocket 44, generally fabricated from a transparent plastic or similar material, is attached to the outboard surface of one of the pieces. In the illustrated example embodiment, the clear pocket 44 is attached to the outboard surface of the pocket piece 40, as shown in FIG. 1A and FIG. 1C; however, other configurations are possible and fall within the contemplated scope of the present general inventive concept. The clear pocket 44 is useful for holding and displaying licenses or legal paperwork associated with, for example, support animals.

As shown in FIG. 1A and in FIG. 2B, in some embodiments, the dog walking bag 10 includes at least one set of elastic straps 26a and 26b on at least one of the outboard surfaces of the bag 10; these elastic straps 26a and 26b are adapted to hold a flashlight F or similar device. In some embodiments, the dog walking bag includes a clip for holding keys. In some embodiments, the dog walking bag includes a pocket adapted to hold dog treats. In some embodiments, the dog walking bag includes a pocket adapted to hold a cell phone. In various example embodiments, one or more of the pockets discussed herein are sealed with magnetic closures.

In various example embodiments, portions of the outboard surfaces of one or more of the pieces are equipped with reflective material adapted to make the dog walking bag more visible at night or in low-light conditions.

In various example embodiments, the dog walking bag is fabricated from washable materials. In some embodiments, certain components of the dog walking bag, such as one or more of the pieces, are fabricated from a nylon cloth or similar material. In some embodiments, various components of the dog walking bag are fabricated from recycled materials.

Figure 4:
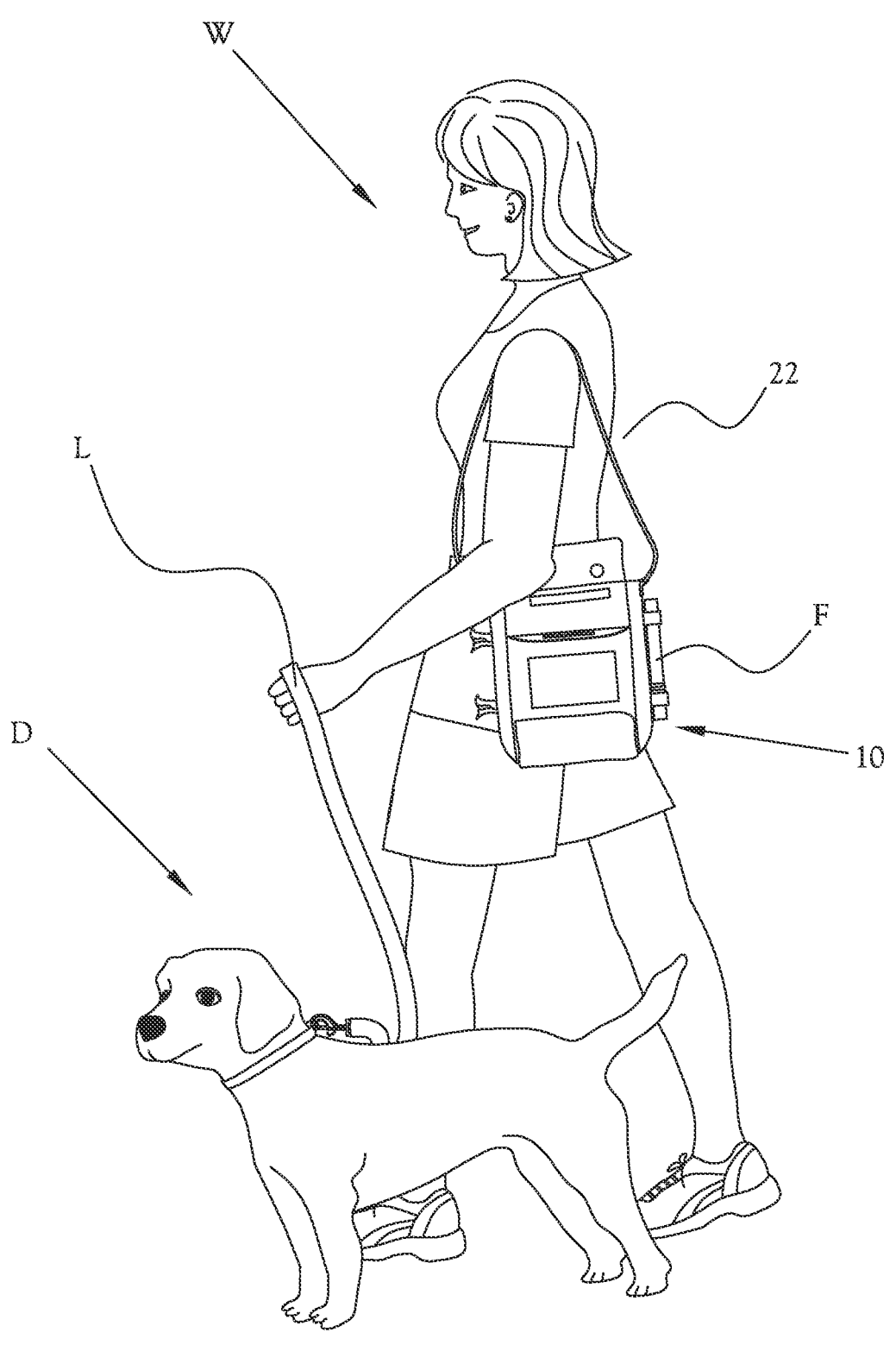
FIG. 4 is a perspective view showing a user using the example embodiment dog walking bag shown in the preceding Figures.

FIG. 4 shows a user (that is, a dog-walker W) using the bag 10 while walking a dog D on a leash L. A dog walking bag according to the present general inventive concept as described herein thus provides a dog walking bag with a central waste-holding compartment to hold full waste bags, with the central waste-holding compartment having two access points—one at the top end and one at the bottom end. A dog walking bag with such a configuration allows a user to empty central waste-holding compartment of full waste bags without the user needing to manually touch the full waste bags during the emptying process.

Various example embodiments of the present general inventive concept provide for a dog walking bag that is adapted to hold a number of items useful when walking a dog. Among other uses and advantages, example embodiments according to the present general inventive concept provide a device that allows for the collection and carrying of plastic waste bags holding animal waste and also facilitates emptying the device of plastic waste bags holding animal waste without requiring a user to manually handle the plastic waste bags holding animal waste. A dog walking bag according to the present general inventive concept may be attached to a dog leash so that, when a user picks up the leash to begin a walk, the dog walking bag is immediately at hand with a number of items useful when walking a dog.

The foregoing example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity.

In the foregoing description, it should be noted that spatially relative terms, such as "up," "down," "top," "bottom," "front," "back," "right," "left," "beneath," "below," "lower," "above," "upper," and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A dog walking bag, comprising:

a front piece, back piece, first side piece, and second side piece, said front piece being joined to said first side piece along a first common edge, said back piece being joined to said first side piece along a second common edge, said back piece being joined to said second side piece along a third common edge, and said front piece being joined to said second side piece along a fourth common edge, said front piece, said back piece, said first side piece, and said second side piece cooperatively defining an interior volume adapted to serve as a central waste-holding compartment, said central waste-holding compartment having a top end and a bottom end, said central waste-holding compartment having a top end opening proximate said top end and a bottom end opening proximate said bottom end;

a top flap to removably cover said top end opening, wherein said top flap is configured to form a foldable leash holder; wherein said foldable leash holder is formed by fastening said top flap to itself with at least one or more set of fastening elements;

a bottom flap to removably cover said bottom end opening using a set of fasteners, wherein said bottom flap extends to cover a front portion of said front piece to form a magnetic closure with magnetic strips, whereas a magnetic strip of said magnetic strips is fixed to each of said bottom flap and an external side of said front piece to form the set of fasteners;

a ready-bag holding compartment positioned at said first side piece adjacent to said central waste-holding compartment, wherein said ready-bag holding compartment comprises a divider piece interposing between said central waste-holding compartment and said ready-bag holding compartment, wherein said ready-bag holding compartment is accessible from proximate of said top end opening of said central waste-holding compartment, and wherein said ready-bag holding compartment holds unused plastic waste bags;

dispensing apertures positioned at said ready-bag holding compartment such that said dispensing apertures are spaced apart to permit said unused plastic waste bags to rest with said ready-bag holding compartment while said unused plastic waste bags being partially exposed through said dispensing apertures for dispensing said unused plastic waste bags from said dispensing apertures;

elastic strips positioned at said second side piece and opposite to said first side piece, said elastic strips adapted to hold a flashlight, whereby said unused plastic waste bags are removed for use with said central waste-holding compartment through said top end opening for depositing animal waste and are extracted from said central waste-holding compartment through said bottom end opening; and wherein said ready-bag holding compartment is continuously extended from said top end to said bottom end of the dog walking bag.

2. The dog walking bag of claim 1, further comprising a bottom portion covering said bottom end opening, said bottom portion including a magnetic closure slit adapted to be widened upon need to produce an aperture adapted to permit extraction of the plastic waste bags holding animal waste from said central waste-holding compartment through said bottom end opening.

3. The dog walking hag of claim 1, further comprising magnetic closures for securing said top flap and said bottom flap.

4. The dog walking bag of claim 1, further comprising D-rings adapted to connecting a shoulder strap to the dog walking bag.

5. The dog walking bag of claim 1, further comprising a pocket to hold dog treats.

6. The dog walking bag of claim 1, further comprising a pocket to hold a cell phone.

7. The dog walking bag of claim 1, further comprising a clear pocket to hold dog identification information.

8. A dog walking bag, comprising:

a bag with an interior volume adapted to serve as a waste-holding compartment, said waste-holding compartment having a top end and a bottom end, said waste-holding compartment having a top end opening proximate said top end and a bottom end opening proximate said bottom end;

a top flap to removably cover said top end opening, wherein said top flap is configured to form a foldable leash holder; wherein said foldable leash holder is formed by fastening said top flap to itself with at least one or more set of fastening elements;

a bottom flap to removably cover said bottom end opening, wherein said bottom flap extends to cover a front portion of said front piece to form a magnetic closure with strips, whereas a strip of said strips is fixed to each of said bottom flap and an external side of said front piece; wherein said front portion is not an edge portion;

a ready-bag holding compartment positioned at said first side piece adjacent to said central waste-holding compartment, wherein said ready-bag holding compartment comprises a divider piece interposing between said central waste-holding compartment and said ready-bag holding compartment, wherein said ready-bag holding compartment is accessible from proximate of said top end opening of said central waste-holding compartment, and wherein said ready-bag holding compartment holds unused plastic waste bags;

dispensing apertures positioned at said ready-bag holding compartment such that said dispensing apertures are spaced apart to permit said unused plastic waste bags to rest with said ready-bag holding compartment while said unused plastic waste bags being partially exposed through said dispensing apertures for dispensing said unused plastic waste bags from said dispensing apertures;

elastic strips positioned at said second side piece and opposite to said first side piece, said elastic strips adapted to hold a flashlight, whereby said unused plastic waste bags are removed for use with said waste-holding compartment through said top end opening for depositing animal waste and are extracted from said waste-holding compartment through said bottom end opening; and wherein said ready-bag holding compartment is continuously extended from said top end to said bottom end of the dog walking bag.

9. The dog walking bag of claim 8, further comprising a bottom portion covering said bottom end opening, said bottom portion including a slit adapted to be widened upon need to produce an aperture adapted to permit extraction of the plastic waste bags holding animal waste from said central waste-holding compartment through said bottom end opening.

10. The dog walking bag of claim 8, further comprising magnetic closures for securing said top flap and said bottom flap.

11. The dog walking bag of claim 8, further comprising D-rings adapted to connecting a shoulder strap to the dog walking bag.

12. The dog walking bag of claim 8, further comprising a pocket to hold dog treats.

13. The dog walking bag of claim 8, further comprising a pocket to hold a cell phone.

14. The dog walking bag of claim 8, further comprising a clear pocket to hold dog identification information.

* * * * *